Dec. 26, 1939.  K. W. WARREN  2,184,327
SHOCK STRUT
Filed Dec. 4, 1935
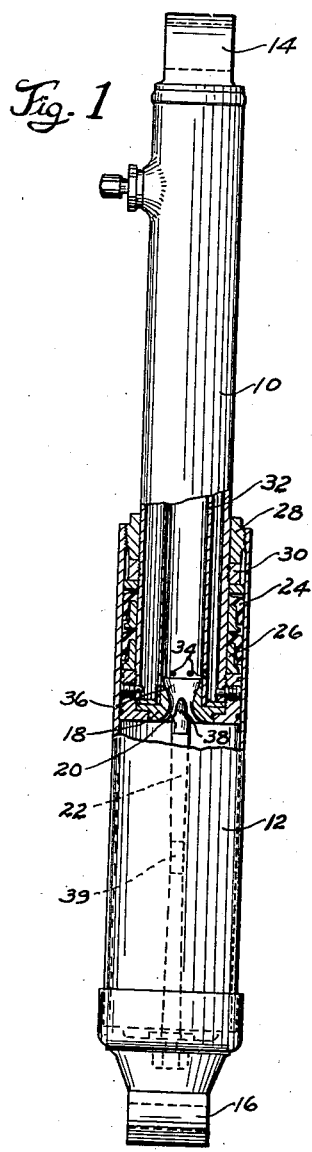
Fig. 1
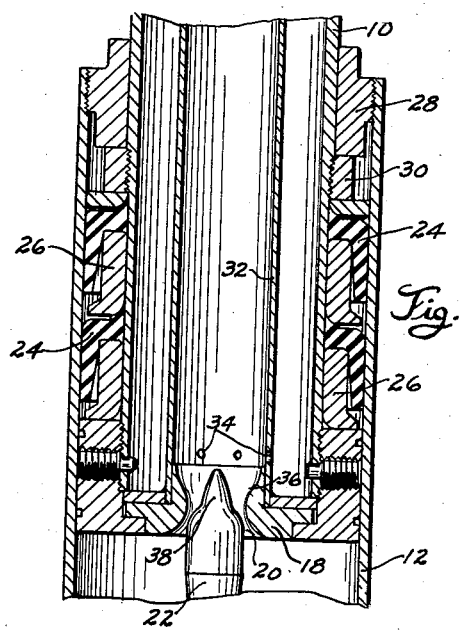
Fig. 2
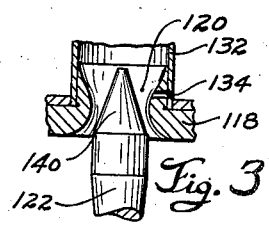
Fig. 3
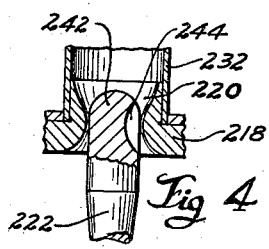
Fig. 4
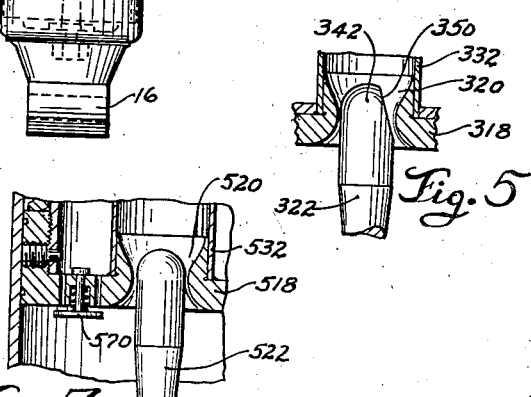
Fig. 5
Fig. 7
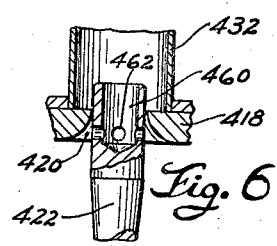
Fig. 6
INVENTOR.
KENNETH W. WARREN.
BY A. E. Wilson
ATTORNEY.

Patented Dec. 26, 1939

2,184,327

UNITED STATES PATENT OFFICE 2,184,327

SHOCK STRUT

Kenneth W. Warren, South Bend, Ind., assignor to Bendix Products Corporation, South Bend, Ind., a corporation of Indiana Application December 4, 1935, Serial No. 52,762

20 Claims. (Cl. 267—64)

This invention relates to shock absorbers and more particularly to metering pins employed in shock absorbers of the type wherein telescopic cylinders are employed, and the shock of landing is dissipated by forcing a liquid to flow from one chamber to another through a restricted orifice.

It is desirable, when shock absorbers are employed to absorb the landing shock of aircraft, that the shock absorber be designed so as to provide high initial resistance so that the pneumatic tire, commonly employed with aircraft, can be fully deflected, or deflected to any desired degree, during the early stages of the telescoping action of the strut. It is also desirable that the shock absorber be so designed that variation in the resistance set up by the shock absorber may be employed to adequately dissipate the kinetic energy in the most advantageous manner to prevent damaging the aircraft or disturbing the passengers thereof.

In one type of shock absorber it is customary to position two telescoping cylinders in such relation that when a force is exerted on the shock absorber, a liquid contained generally in a lower chamber is forced through a restricted orifice into an upper chamber. The upper chamber is generally provided with a quantity of compressed fluid such as air to provide a given degree of resistance sufficient to support the aircraft when on the ground and to provide a given degree of resiliency to absorb the normal shock of taxiing the aircraft when on the ground. In shock absorbers the effective area of the orifice is generally controlled by means of a metering pin so designed as to provide a different effective orifice area at various stages of the telescoping action of the shock absorber means.

When the shock absorber is subjected to load the fluid or liquid contained in the lower chamber is spurted through the orifice at high velocity to dissipate the kinetic energy of landing. Considerable turbulence is therefore created, whereupon the liquid mixes with the compressed air contained in the upper chamber to form an emulsion of liquid and air in the upper chamber. As a greater quantity of liquid is injected into the upper chamber, the air therein is compressed to a higher degree, whereupon more energy is absorbed and a cushioning action is effected to absorb the taxiing shock. When the load is relieved from the shock absorbers, the air compressed to a higher degree in the upper chamber exerts a force to separate the chambers, whereupon the liquid flows back through the restricted orifice into the lower chamber. In view of the fact that an emulsion of liquid and air is contained in the upper cylinder of the strut a considerable quantity of air is passed through the orifice into the lower chamber when the strut is extended. It has been found that considerable time is required for the air to diffuse through the liquid and reach the upper chamber. Unless all of the air is transferred to the upper chamber, the initial movement of the telescoping action will not be as effective to dissipate energy as where solid liquid is contained in the lower chamber. It is therefore desirable to provide means for permitting the air to diffuse through the liquid and reach the upper chamber as quickly as possible when the shock strut is moved to the extended position.

It has also been found that where high telescoping velocity of the members is encountered that unless smooth correctly proportioned passages are provided considerable turbulence of the liquid is set up as the liquid is spurted through the orifice past the metering pin. This turbulence operates to cause mixing of the liquid and the air in the upper chamber to a greater degree than is desirable.

It is therefore an object of this invention to provide a shock absorber having means to permit the rapid diffusion of air through the liquid to the upper chamber when the shock absorber members are moved to the extended position.

Another object of the invention is to provide a shock absorber having a streamlined orifice between the telescoping chambers to permit the movement of the liquid from one chamber to the other with the least possible turbulence to insure uniformity in the resistance developed by the shock absorber.

A still further object of the invention is to provide a shock absorber having a metering pin provided with a tapered upper section to permit relatively rapid flow of air from the liquid chamber to the air chamber when the shock absorber is in the fully extended position.

Another object of the invention is to provide a shock absorber having a pair of telescoping liquid and air chambers separated by a piston having an orifice, the effective area of which is controlled by a metering pin designed to practically close the orifice when the members are in the extended position, and means associated with the piston to permit rapid movement of air from the liquid chamber to the air chamber when the shock absorber is in the extended position.

Yet a further object of the invention is to provide a shock absorber having a liquid chamber and an air chamber separated by a streamlined orifice, and provided with a metering pin designed to permit relatively free communication between the chambers when the shock absorber is in the fully extended position.

Another object of the invention is to provide a metering pin, for a shock absorber, having a cut away upper section to permit relatively free communication between the chambers of the shock absorber when the shock absorber is moved to the fully extended position.

A still further object of the invention is to provide a method of dissipating energy in a shock absorber by forcing a solid liquid through a streamlined orifice.

Other objects and advantages of this invention will be apparent from the following detailed description, considered in connection with the accompanying drawing, submitted for purposes of illustration only, and not intended to define the scope of the invention, reference being had for that purpose to the subjoined claims.

In the drawing, wherein similar reference characters refer to similar parts throughout the several views:

Figure 1 is a longitudinal view partly in section of a shock absorber embodying the present invention;

Figure 2 is an enlarged view of a portion of Figure 1;

Figure 3 is a sectional view of a portion of Figure 2 illustrating a modified form of the invention;

Figure 4 is a view similar to Figure 3 showing a further modified form;

Figure 5 is a view similar to Figure 4 showing a still further modified form;

Figure 6 is a view similar in some respects to Figure 5 showing a conventional type orifice and a metering pin designed to permit relatively rapid flow of air from the liquid chamber to the air chamber when the shock absorber is in the fully extended position; and Figure 7 is a view showing a check valve in the piston separating the chambers, designed to permit the escape of air from the liquid chamber.

Referring more particularly to Figure 1 there is shown a shock absorber having inner and outer telescoping cylinders 10 and 12 respectively. Each of the cylinders 10 and 12 is provided with a fitting or clevice 14 and 16 respectively, designed to permit the attachment of the shock absorber to the landing gear and fuselage of an aircraft. The lower end of the inner cylinder 10 is closed by a piston 18, having an orifice 20 positioned in the central portion thereof. A metering pin 22 of varying cross sectional area is carried by the lower portion of the outer cylinder 12, and is designed to pass through the orifice 20 to vary the effective area of the orifice.

Means including resilient washer members 24 and metallic cups 26 are interposed between the inner cylinder 10 and the outer cylinder 12 to prevent the escape of liquid from the cylinders when telescoping action is produced, whereupon pressure is exerted between the respective cylinders. The cylinders 10 and 12 are prevented from separating by means of a threaded sleeve 28 engaging the end of the outer cylinder 12, and contacting with an abutment 30 carried by the inner cylinder 10. A check tube 32 is carried by the piston 18. The check tube 32 is provided at its upper end with a check valve (not shown) to permit liquid to overflow the check tube into the space between the check tube 32 and the inner walls of the cylinder 10 under certain conditions of operation. A plurality of orifices 34 are positioned in the lower portion of the check tube 32 to permit liquid to flow from the space between the check tube 32 and the inner cylinder 10 when the shock strut is moved in the extended position. This structure prevents too rapid separation of the cylinders.

It will be observed from Figures 1 and 2 that the piston 18 is provided with an orifice 20, and that the inner edges of the piston 18 are formed so as to provide a streamlined orifice by extending the inner edge of the piston 18 into the check tube 32 to form a receding streamlined section 36.

It will be observed that the upper end of the metering pin 22 is formed with a curved section 38 designed to expose a relatively large area for the escape of air between the end of the metering pin 22 and the inner edge of the piston 18. The upper end of the metering pin is tapered, to cooperate with the streamlined section 36 of the piston 18 to permit the flow of liquid into the check tube 32 with the minimum of turbulence.

The operation of the structure thus far described is as follows. When the shock strut is subjected to load the cylinder 10 is moved downwardly in the cylinder 12 whereupon the inner edge of the piston 18 moves over the enlarged upper end of the metering pin 22, whereupon the orifice 20 is practically closed. The telescoping action of the cylinders 10 and 12 is then materially restricted and the pneumatic tire carried by the aircraft is deflected to a desired extent, whereupon a sufficient pressure is exerted upon the liquid contained in the cylinder 12 to force the cylinders to telescope. A relatively rapid rate of liquid flow from the cylinder 12 is established as the decreasing area of the metering pin 22 is projected through the orifice 20.

It will be observed that the metering pin 22 is designed with a section of minimum cross sectional area 39 and that the metering pin progressively increases in cross sectional area from that point. In this way the energy absorbed from the shock absorber can be controlled effectively as more particularly pointed out in the copending application of Carl V. Johnson, Serial No. 533,735, filed April 29, 1931.

When the shock absorber approaches the completely telescoped position, the air contained in the inner cylinder 10 is compressed to a high degree to support the load to which the shock absorber is subjected. When the load is removed from the absorber, the compressed air in the cylinder 10 forces the cylinders 10 and 12 to separate whereupon liquid flows through the orifice 20 into the outer cylinder 12. When the cylinders approach the fully extended position the metering pin 22 is in spaced relation with respect to the piston 18 of the cylinder 10 so that a portion of the orifice 20 is exposed to permit rapid flow of air from the liquid cylinder 12 to the air cylinder 10.

It will be observed that the orifice 20 is streamlined so that a uniform flow and therefore uniform resistance to the flow of liquid is encountered. The reliability of the shock absorber is therefore improved. The construction of the metering pin and orifice is such as to assure a quantity of solid liquid for the initial operation of the strut, the liquid not being diluted by a quantity of air trapped below the piston 18, to decrease the efficiency of the shock absorber action.

Figure 3 illustrates an embodiment of the invention wherein the upper end of the metering pin 122 is provided with a progressively tapering section 140. It has been found that a metering pin and orifice designed in accordance with the disclosure of Figure 3 gives very good efficiency, and the manufacturing cost of this structure is less than the manufacturing cost of certain other types of metering pins.

Figure 4 illustrates an embodiment of the invention wherein a metering pin having an enlarged upper end 242 is provided. The end of the pin is designed to practically close the orifice 220 in the piston 218. A slot 244 is provided in the upper end of the pin to permit the escape of trapped air from the liquid in the lower chamber to provide solid liquid for the initial operation of the strut.

Figure 5 shows a construction similar in many respects to Figure 4, wherein the upper end of the metering pin 342 is flat on one side 350 to provide a space between the inner edge of the piston 318 and the metering pin to permit the escape of air from the liquid cylinder.

Figure 6 shows a metering pin 422, the upper end of which is drilled longitudinally to form a bore 460 communicating with cross bores 462 to permit the escape of air from the liquid cylinder to the air cylinder, when the shock absorber is in the fully extended position.

Figure 7 shows an embodiment of the invention wherein the upper end of the metering pin 522 is designed to practically close the orifice 520 through the piston 518, when the shock absorber is in the fully extended position. A spring pressed check valve 570 is positioned in the piston 518 to permit the escape of air from the liquid cylinder to the air cylinder when the orifice 520 is substantially closed as when the cylinders are in the fully extended position. In this embodiment of the invention, as the shock absorber is subjected to load the pressure of the liquid in the liquid cylinder closes the check valve 570 to prevent the escape of liquid from the liquid chamber to the air chamber through the check valve mechanism.

While the invention has been described with particular reference to several preferred embodiments, it is not intended to confine the scope of the invention to the features illustrated and described, nor otherwise than by the terms of the following claims.

I claim:

1. A shock strut having an air chamber, a liquid chamber, a piston having a streamlined orifice positioned therein carried by one end of the air chamber, and a metering pin carried by the liquid cylinder and designed to vary the effective area of the streamlined orifice and to render the orifice relatively unrestricted when in the fully extended position to permit the escape of air from the liquid chamber and to materially restrict the orifice upon slight telescoping movement of the chambers.

2. In a shock strut a liquid cylinder, an air cylinder designed to slide into the liquid cylinder upon the application of force thereto, a piston closing the lowest end of the air cylinder, a streamlined orifice positioned in the piston, a metering pin carried by the liquid cylinder and designed to restrict the streamlined orifice when the air cylinder is telescoped into the liquid cylinder, the upper end of the metering pin being designed to leave the orifice partially unrestricted when the cylinders are in the extended position to permit the escape of air trapped in the liquid cylinder during the extending movement of the cylinders and to abruptly restrict the orifice during the initial telescoping movement of the cylinder.

3. In a shock strut a liquid chamber, an air chamber adapted to slide into the liquid chamber, a piston having a streamlined orifice closing the lower end of the air chamber, a check tube carried by the piston and projecting into the air chamber, a metering pin carried by the liquid cylinder and adapted to vary the effective area of the streamlined orifice at various telescoping positions of the shock strut, the end of the metering pin being designed to permit the escape of trapped air from the liquid chamber when the cylinders are in the fully extended position and to materially restrict the flow of liquid upon slight telescoping movement of the chambers.

4. A shock strut having a liquid chamber, an air chamber, a quantity of liquid in the liquid chamber, compressed air in the air chamber, a piston having a streamlined orifice separating the chambers, a metering pin designed to vary the effective area of the streamlined orifice at various operating positions and to render the orifice substantially unrestricted when the strut is in the fully extended position and substantially restricted after slight movement from the fully extended position.

5. In a telescoping shock strut having a liquid cylinder, an air cylinder, a quantity of liquid in the liquid cylinder, compressed air in the air cylinder, a piston having a streamlined orifice separating the cylinders, a metering pin designed to vary the effective area of the streamlined orifice at various operating positions and provided with a slotted upper end to render the orifice substantially unrestricted when the strut is in the fully extended position and to render the orifice substantially restricted when the strut is moved slightly from the fully extended position.

6. In a telescoping shock strut having a liquid cylinder, an air cylinder, a quantity of liquid in the liquid cylinder, compressed air in the air cylinder, a piston having an orifice separating the cylinders, a metering pin designed to vary the effective area of the orifice at various operating positions and provided with a longitudinal bore communicating with cross bores in the upper end to render the orifice substantially unrestricted when the strut is in the fully extended position and substantially restricted when the cross bores pass through said orifice.

7. In a shock strut, a liquid cylinder, an air cylinder designed to slide into the liquid cylinder, packing means between the liquid and air cylinders, a piston having a streamlined orifice carried by the lower end of the air cylinder, a metering pin designed to vary the effective area of the streamlined orifice at various operating positions, the upper end of the metering pin being tapered on one side to permit relatively free communication between the cylinders when in the fully extended position and to materially restrict the streamlined orifice in the slightly telescoped position.

8. A shock strut having an upper chamber, a lower chamber, a piston having a streamlined orifice positioned therein associated with the upper chamber, and a metering pin associated with the lower chamber and designed to vary the effective area of the orifice and to render the orifice sufficiently unrestricted when the strut is in the fully extended position to permit the escape of air from the lower chamber and sufficiently restricted when the strut is moved slightly from the fully extended position to materially restrict the flow of liquid.

9. A shock strut having an air chamber, a liquid chamber, a piston having an orifice positioned therein carried by one end of the air chamber, and a metering pin carried by the liquid cylinder and designed to vary the effective area of the orifice and to render the orifice relatively unrestricted when in the fully extended position to permit the escape of air from the liquid chamber and to materially restrict the orifice upon slight telescoping movement of the chambers.

10. In a shock strut a liquid cylinder, an air cylinder designed to slide into the liquid cylinder upon the application of force thereto, a piston closing the lowest end of the air cylinder, an orifice positioned in the piston, a metering pin carried by the liquid cylinder and designed to restrict the streamlined orifice when the air cylinder is telescoped into the liquid cylinder, the upper end of the metering pin being designed to leave the orifice partially unrestricted when the cylinders are in the extended position to permit the escape of air trapped in the liquid cylinder during the extending movement of the cylinders and to abruptly restrict the orifice during the initial telescoping movement of the cylinder.

11. In a shock strut a liquid chamber, an air chamber adapted to slide into the liquid chamber, a piston having an orifice closing the lower end of the air chamber, a check tube carried by the piston and projecting into the air chamber, a metering pin carried by the liquid cylinder and adapted to vary the effective area of the orifice at various telescoping positions of the shock strut, the end of the metering pin being designed to permit the escape of trapped air from the liquid chamber when the cylinders are in the fully extended position and to materially restrict the flow of liquid upon slight telescoping movement of the chambers.

12. A shock strut having a liquid chamber, an air chamber, a quantity of liquid in the liquid chamber, compressed air in the air chamber, a piston having an orifice separating the chambers, a metering pin designed to vary the effective area of the orifice at various operating positions and to render the orifice substantially unrestricted when the strut is in the fully extended position and substantially restricted after slight movement from the fully extended position.

13. In a telescoping shock strut having a liquid cylinder, an air cylinder, a quantity of liquid in the liquid cylinder, compressed air in the air cylinder, a piston having an orifice separating the cylinders, a metering pin designed to vary the effective area of the orifice at various operating positions and provided with a slotted upper end to render the orifice substantially unrestricted when the strut is in the fully extended position and to render the orifice substantially restricted when the strut is moved slightly from the fully extended position.

14. In a shock strut, a pair of telescoping liquid and air cylinders, packing means between the liquid and air cylinders, a piston having an orifice carried by the lower end of one of the cylinders, a metering pin designed to vary the effective area of the orifice at various operating positions, the upper end of the metering pin being tapered on one side to permit relatively free communication between the cylinders when in the fully extended position and to materially restrict the orifice in the slightly telescoped position.

15. A shock strut having an upper chamber, a lower chamber, a piston having an orifice positioned therein associated with the upper chamber, and a metering pin associated with the lower chamber and designed to vary the effective area of the orifice and to render the orifice sufficiently unrestricted when the strut is in the fully extended position to permit the escape of air from the lower chamber and sufficiently restricted when the strut is moved slightly from the fully extended position to materially restrict the flow of liquid.

16. In a shock strut having telescoping liquid and fluid cylinders, a quantity of liquid in the liquid cylinder, a quantity of compressed fluid in the fluid cylinder, a partial closure including an orifice between the cylinders, a check tube having a plurality of metering orifices at the lower end carried by the partial closure, a check valve at the upper end of the check tube, and a metering pin designed to slide within the check tube and to vary the effective area of the orifice at various operating positions and to render the orifice substantially unrestricted when the strut is in the fully extended position and substantially restricted after slight movement from the fully extended position.

17. That method of absorbing the landing shock of aircraft which comprises forcing a liquid from one chamber to another chamber containing a quantity of compressed fluid, and controlling the rate of liquid flow in such a manner that the liquid flow is relatively unrestricted when the landing shock is applied and the resistance to the flow of liquid is rapidly restricted after the landing shock is applied and is then progressively decreased and increased as the load is applied.

18. The method of absorbing the landing shock of aircraft which comprises the steps of forcing a liquid from one chamber to another chamber containing a quantity of compressed fluid through a relatively unrestricted opening when the landing shock is first applied and rapidly restricting the opening immediately thereafter.

19. The method of absorbing the landing shock of aircraft which comprises forcing liquid from one chamber to another chamber containing a quantity of compressed fluid through a relatively unrestricted orifice, partially closing the orifice immediately after the landing shock has been effected, increasing the effective size of the orifice progressively thereafter as the landing load is received, and removing the restriction of the orifice when the load is removed.

20. A shock strut having a pair of chambers, a piston having an orifice positioned therein carried by one end of one chamber, and a metering pin carried by the other chamber and designed to vary the effective area of the orifice to render the orifice relatively unrestricted when the structure is in the fully extended position to permit the escape of air from the second named chamber, and to materially restrict the orifice upon slightly telescoping movement of the chambers.

KENNETH W. WARREN.